United States Patent [19]

Pallesen

[11] Patent Number: 5,322,656
[45] Date of Patent: Jun. 21, 1994

[54] METHOD AND APPARATUS FOR COATING THE OUTER SURFACE OF AN ELONGATED BODY WITH A LAYER OF CONCRETE

[75] Inventor: Jes Pallesen, Mundelstrup, Denmark
[73] Assignee: Vibrodens A/S, Soeborg, Denmark
[21] Appl. No.: 915,837
[22] PCT Filed: Jan. 29, 1991
[86] PCT No.: PCT/DK91/00026
§ 371 Date: Jul. 20, 1992
§ 102(e) Date: Jul. 20, 1992
[87] PCT Pub. No.: WO91/11653
PCT Pub. Date: Aug. 8, 1991

[30] Foreign Application Priority Data
Jan. 29, 1990 [DK] Denmark .................. 230/90

[51] Int. Cl.⁵ .................. B28B 1/16; B28B 1/26; B28B 21/06; B28B 21/08
[52] U.S. Cl. .................. 264/87; 249/91; 249/113; 249/137; 249/139; 264/259; 264/278; 264/279; 264/313; 425/63; 425/64; 425/85; 425/125; 425/126.1; 425/197; 425/447
[58] Field of Search .................. 264/86, 87, 71, 259, 264/278, 279, 313, 334; 425/84, 85, 125, 63–65, 447, 126.1, 425, 426, 262, 197; 249/113, 90, 91, 137, 139

[56] References Cited

U.S. PATENT DOCUMENTS

| | | | |
|---|---|---|---|
| 1,552,064 | 9/1925 | Lake | 264/314 X |
| 1,888,101 | 11/1932 | Wilson | 264/87 |
| 2,321,277 | 6/1943 | Boyle | 425/85 X |
| 2,585,756 | 2/1952 | Eschenbrenner | 425/85 X |
| 2,625,728 | 1/1953 | Eschenbrenner | 425/85 |
| 2,655,710 | 10/1953 | Roensch et al. | 425/85 X |
| 2,966,715 | 1/1961 | Vianini | 264/314 X |
| 3,034,192 | 5/1962 | Maillard | 264/87 |
| 3,037,244 | 6/1962 | Boggs | 264/314 |
| 3,468,001 | 9/1969 | Bodine, Jr. | 425/64 X |
| 3,516,129 | 6/1970 | Yoder | 425/64 |
| 3,551,968 | 1/1971 | Fosse et al. | 425/262 X |
| 3,909,173 | 9/1975 | Latter | 425/450.1 X |
| 4,217,080 | 8/1980 | Sandowicz et al. | |
| 4,578,235 | 3/1986 | Schmidgall et al. | 249/91 X |
| 4,954,062 | 9/1990 | Willing | 425/84 X |
| 4,957,424 | 9/1990 | Mitchell et al. | 425/262 X |
| 5,120,389 | 6/1992 | Behr | 425/64 X |

FOREIGN PATENT DOCUMENTS

| | | |
|---|---|---|
| 479684 | 12/1976 | Australia . |
| 644/84 | 8/1985 | Denmark . |
| 1080827 | 4/1960 | Fed. Rep. of Germany . |
| 2001825 | 7/1971 | Fed. Rep. of Germany ...... 249/137 |
| 2101093 | 7/1972 | Fed. Rep. of Germany ...... 249/137 |
| 2405363 | 10/1975 | Fed. Rep. of Germany ...... 249/137 |
| 3520581 | 12/1985 | Fed. Rep. of Germany ...... 249/137 |
| 155460 | 4/1989 | Fed. Rep. of Germany . |
| 418940 | 7/1981 | Sweden . |
| 451275 | 9/1987 | Sweden . |
| 8503734 | 8/1985 | World Int. Prop. O. . |

Primary Examiner—Karen Aftergut
Attorney, Agent, or Firm—Merchant & Gould, Smith, Edell, Welter & Schmidt

[57] ABSTRACT

An apparatus for coating the outer surface of an elongated body (10), such as a rod or tube, with a layer of concrete (30) includes a frame structure (21). Pipe or tube sections (10) may be supplied to a tilting device (27) in a horizontal position on a carriage (12) and tilted to a vertical position within the tower-like frame structure (21). The apparatus comprises means (24, 27) for retaining the elongated body (10) in the upright position within the frame structure and an annular mould (26) for surrounding the upright elongated body so as to define an annular space between the elongated body and the annular mould, and concrete may be fed to the annular mould space by feeding means (28, 29). The mould may include an upper funnel-like part, which is rotatable about the axis of the annular mould relative to the remaining part of the mould so as to distribute the concrete mixture peripherally in the annular mould space. The moulded concrete layer may be exposed to vacuum by means of a skirt-like vacuum chamber, whereby free water may be withdrawn from the concrete layer.

16 Claims, 8 Drawing Sheets

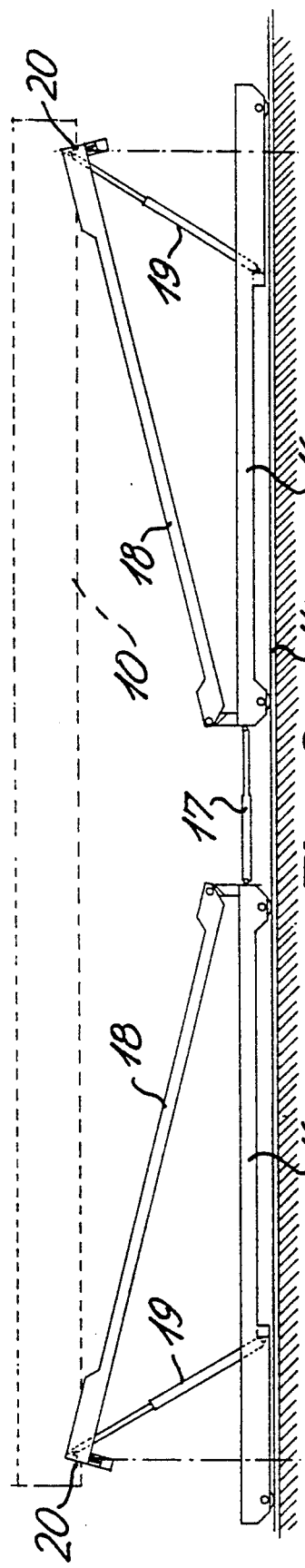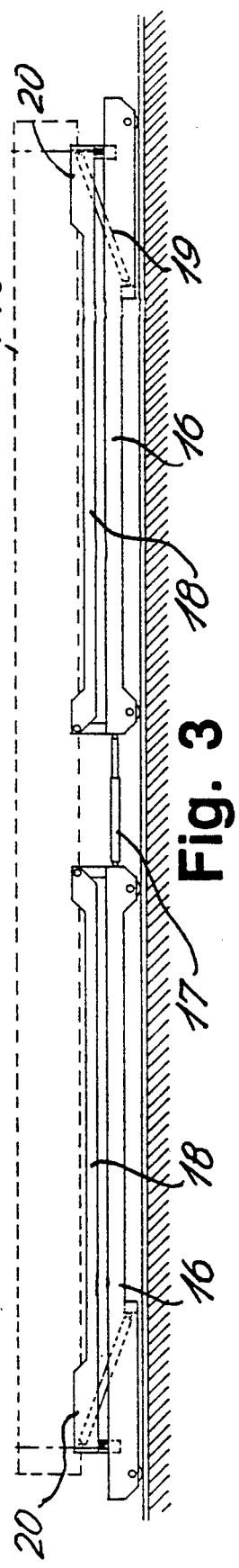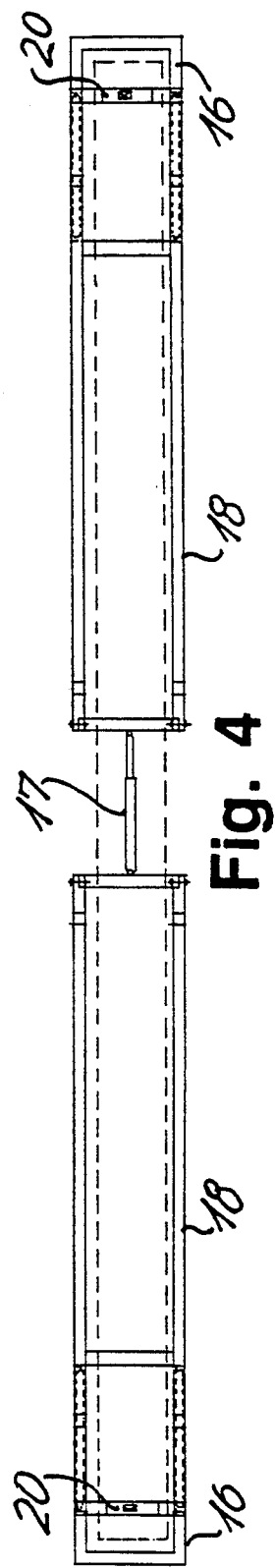

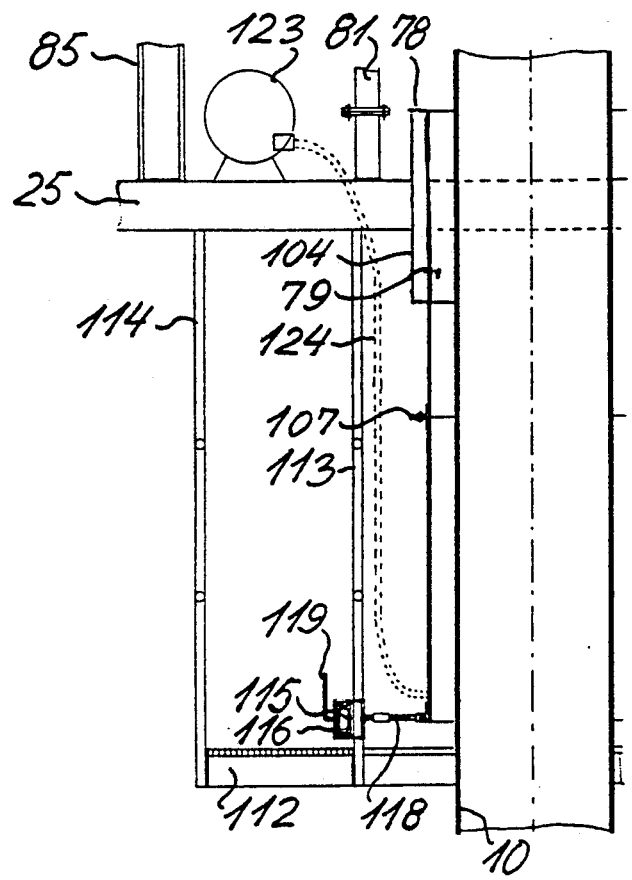
Fig. 14
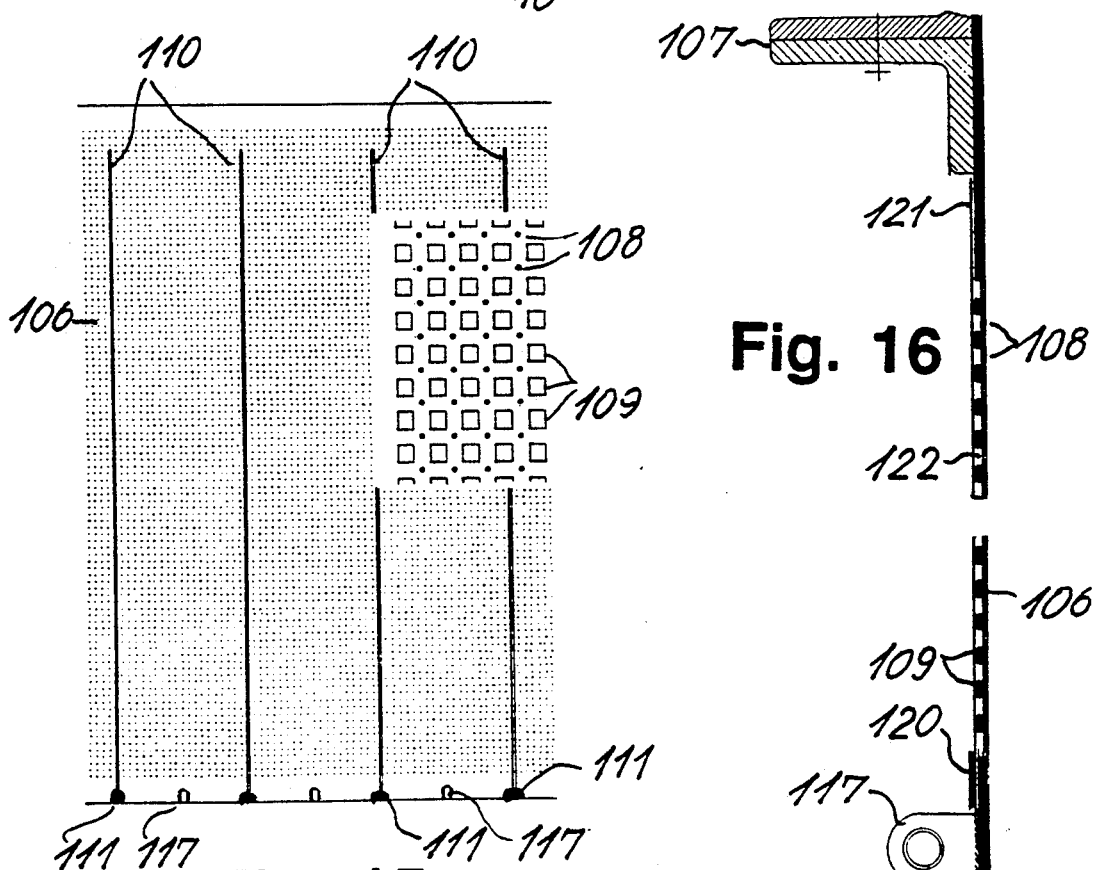
Fig. 16
Fig. 15

METHOD AND APPARATUS FOR COATING THE OUTER SURFACE OF AN ELONGATED BODY WITH A LAYER OF CONCRETE

FIELD OF THE INVENTION

The present invention relates to a method of coating the outer surface of an elongated body, such as a rod or tube, with a layer of concrete.

BACKGROUND OF THE INVENTION

Submarine pipelines, for example for transporting petroleum or gas from offshore production fields may be made from steel pipe sections which are welded together on a special vessel, and the pipeline may be placed in position at the bottom of the sea as the pipe sections are being welded together. In order to secure that the pipeline remains in the desired position at the bottom at the sea, the pipe sections may be given a negative buoyancy by providing the outer peripheral surface of each pipe section with a layer of concrete. The pipe sections are preferably provided with the concrete coating before they are welded together on the vessel, and the opposite free end portions of the pipe section are exposed to facilitate the welding operation. The concrete layer should not only fulfill the usual conditions regarding strength and durability, but it could also be necessary to add heavy aggregates, such as iron ore in order to obtain a required high specific weight of the concrete.

Two different methods for providing pipe or tube sections with an outer layer of concrete are known, namely impingement and compression coating. Both of these methods in which the horizontally arranged tube is rotated and moved past a stationary coating machine, involves waste of concrete mixture and insufficient compression of the concrete. The insufficient compression of the concrete necessitates a relatively high content of heavy aggregates to obtain the necessary specific weight. Danish patent specification No. 155.460 discloses a method in which a horizontally extending tube is rotated slowly while concrete is applied to the full length of the tube, and the concrete is being shaped and vibrated by means of a mould surface provided with vibrators. This method has apparently not been used in practice. Danish patent application No. 644/84 discloses a sliding mould which may be used for applying ground-moist concrete to a steel pipe, which is positioned vertically.

SUMMARY OF THE INVENTION

The present invention provides a method of the above type which has been improved in various respects.

The present invention provides a method of coating the outer surface of an elongated body, such as a rod or tube, with a layer of concrete, said method comprising, arranging the elongated body in upright position, arranging an annular mould around the outer surface of the elongated body so as to define an annular space therebetween, feeding a concrete mixture to an upper funnel-like part of the mould, rotating the funnel-like part in relation to the remaining part of the mould so as to distribute the concrete mixture peripherally in said annular space, and moving the annular mould upwardly along the elongated body so as to form said layer of concrete on the outer surface thereof. Because of the rotating funnel-like part it is possible to obtain an even distribution of the concrete peripherally along the annular moulding space, even when the moisture content of the concrete is relatively low.

The invention also provides an apparatus for coating the outer surface of an elongated body, such as a rod or tube, with a layer of concrete, said apparatus comprising a frame structure, means for retaining the elongated body in an upright position within the frame structure, an annular mould for surrounding the upright elongated body so as to define an annular space between the elongated body and the annular mould, said mould comprising an upper funnel-like part which is rotatable about the axis of the annular mould relative to the remaining part of the mould, means for feeding a concrete mixture to said funnel-like mould part, means for rotating the funnel-like part in relation to the remaining part of the mould so as to distribute the concrete mixture peripherally in said annular space, and means for moving the annular mould axially along the upright elongated body so as to form said layer of concrete on the outer surface thereof.

According to a second aspect the present invention provides a method of coating the outer surface of an elongated body, such as a rod or tube, with a layer of concrete, said method comprising arranging the elongated body in an upright position, arranging an annular mould around the outer surface of the elongated body so as to define an annular space therebetween, feeding a concrete mixture into the upper part of said annular space, moving the annular mould upwardly along the elongated body so as to form said layer of concrete on the outer surface thereof, and exposing the concrete layer to vacuum through perforations formed in a lower skirt of the annular mould so as to withdraw free water from the concrete layer and thereby stabilize the same.

The invention also provides an apparatus for coating the outer surface of an elongated body, such as a rod or tube, with a layer of concrete, said apparatus comprising a frame structure, means for retaining the elongated body in an upright position within the frame structure, an annular mould for surrounding the upright elongated body so as to define an annular space between the elongated body and the annular mould, a perforated skirt depending from the annular mould and forming a lower extension thereof, means for feeding a concrete mixture into the upper part of said annular space, means for moving the annular mould upwardly along the elongated body so as to form said layer of concrete of the outer surface thereof, and means for exposing the concrete layer to vacuum through perforations defined in said skirt, so as to withdraw free water from the concrete layer and thereby stabilize the same.

According to a third aspect the present invention provides a method of coating the outer surface of an elongated body, such as a rod or tube, with a layer of concrete, said method comprising fastening one end of a substantially horizontally extending elongated body to a power operated rotatable lifting member, rotating the lifting member about a horizontal axis extending substantially at right angles to the longitudinal axis of the elongated body so as to tilt the same to an upright position, arranging an annular mould around the outer surface of the upright elongated body so as define an annular space therebetween, feeding a concrete mixture into the upper part of said annular space, and moving the annular mould upwardly along the elongated body so as to form said layer of concrete on the outer surface thereof.

In order to further stabilize the moulded concrete layer so that the production rate may be increased, and in order to further compact the concrete so as to increase the specific weight thereof the concrete layer formed on the outer surface of the elongated body may be exposed to vacuum through perforations formed in a lower skirt of the annular mould so as to withdraw free water from the concrete layer and thereby stabilize the same.

The perforations of the skirt may communicate with a vacuum chamber defined between the outer surface of the skirt and an outer peripheral wall surrounding the same, and this vacuum chamber may be connected to a suitable vacuum source, such as a vacuum pump.

The skirt may be axially slitted and the outer peripheral wall may be made from a flexible material, such as a sheet material of plastic or rubber, whereby the layer of concrete is exposed to radial compression when the vacuum chamber is connected to a vacuum source. Consequently, the cast concrete layer is further stabilized and the specific weight of the concrete is increased.

The elongated body to be coated is normally stored in a substantially horizontal position, and it may then be arranged in a vertical position by means of a crane, a hoist or a similar lifting device. However, the method according to the invention may further comprise fastening one end of the substantially horizontally extending elongated body to a power operated tiltable lifting member, rotating the lifting member about a horizontal axis extending substantially at right angles to the longitudinal axis of the elongated body so as to tilt the same to said upright position. This method of transferring the tubular body from a horizontal to a vertical position is rather time saving. The rotatable lifting member may also be used for moving the elongated body back to a horizontal position when it has been coated with a concrete layer.

Furthermore, the invention provides an apparatus for coating the outer surface of an elongated body, such as a rod or tube, with a layer of concrete, said apparatus comprising a frame structure, a lifting member arranged in the lower part of the frame structure tiltably about a substantially horizontal axis, means for connecting one end of the elongated body arranged in a horizontal position to the lifting member, power means for rotating the lifting member about the horizontal axis extending at substantially right angles to the longitudinal axis of the elongated body so as to tilt the same to an upright position within the frame structure, means for retaining the elongated body in said upright position within the frame structure, an annular mould for surrounding the upright elongated body so as to define an annular space between the elongated body and the annular mould, means for feeding a concrete mixture into the upper part of said annular space, and means for moving the annular mould upwardly along the elongated body so as to form said layer of concrete on the outer surface thereon.

The apparatus may further comprise a perforated skirt depending from the annular mould and forming a lower extension thereof, and means for exposing the concrete layer to vacuum through perforations defined in said skirt, so as to withdraw free water from the concrete layer, whereby the concrete layer may be stabilized and the specific weight thereof may be increased.

Said connecting means may comprise a mandrel member to be received in an axial bore of the elongated body, for example the bore of a tubular body, and expandible means may be arranged on the mandrel member to engage with the inner peripheral surface of the bore in the expanded condition. Such expandible means may be of any kind and may, for example be expanded by means of pressure fluid or pressurized gas. In the preferred embodiment the expandable means comprise a hollow annular inflatable member positioned around the mandrel member, whereby the mandrel tends to be centered within the tubular member when the annular inflatable member is inflated.

The connecting means may further or alternatively comprise a socket member for receiving an end portion of the elongated body therein.

BRIEF DESCRIPTION OF THE DRAWINGS

The invention will now be further described with reference to the drawings, wherein FIGS. 2 and 3 show in an enlarged scale side views of a carriage for transporting un-coated tube sections to the casting apparatus, shown in an elevated and a lowered position, respectively, FIG. 4 is a top plan view of the carriage shown in FIGS. 2 and 3, FIG. 14 is a side view and partially sectional view showing a vacuum or dewatering arrangement of the concrete casting apparatus, FIG. 15 is a slit, perforated dewatering membrane or skirt shown in a plane condition, FIG. 16 is a sectional view of a vacuum chamber partly defined by the perforated skirt shown in FIG. 15.

DETAILED DESCRIPTION OF THE PREFERRED EMBODIMENT

Figure 1:
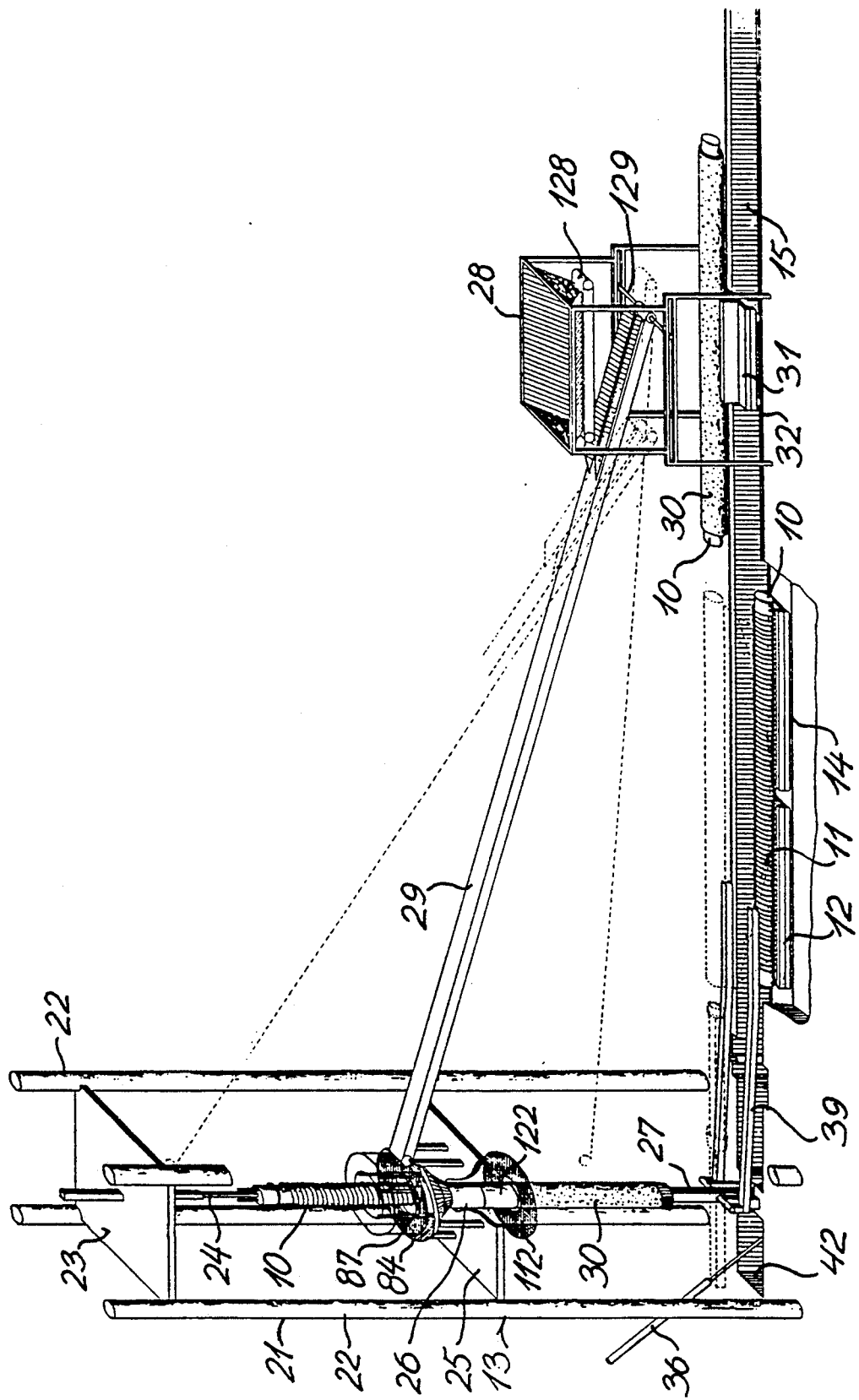
FIG. 1 is a perspective view of an embodiment of the apparatus according to the invention for casting a layer or coating of reinforced concrete on the outer peripheral surface of pipe or tube sections.

FIG. 1 illustrates a plant or apparatus for casting a layer or coating of steel reinforced concrete on the outer peripheral surface of elongated bodies, such as pipe or tube sections.

Each such pipe or tube section 10 to be coated is provided with a steel reinforcement 11 comprising a reinforcing wire wound helically around the peripheral outer surface of the pipe section. The windings of the helical wire may be interconnected by longitudinally extending wires welded to the windings of the helical wire. The tubular steel reinforcement may be radially spaced from the peripheral surface of the pipe or tube sections 10 by means of suitable spacing means, so that the tubular steel reinforcement is maintained in a substantially co-axial position in relation to the tube or pipe section. The opposite free end portions of each of the pipe or tube sections are preferably not covered by the tubular steel reinforcement 11.

A pipe section 10 with the steel reinforcement 11 may be positioned on a carriage 12 and moved to an upright concrete casting apparatus 13. The carriage 12 may be moved towards the apparatus 13 along a track 14 positioned in a channel or ditch 15 below ground level.

The carriage 12, which is shown in more detail in FIGS. 2-4, comprises a pair of separate underframes 16 interconnected by means having a selectively variable length, such as a double-acting pressure fluid cylinder 17. A supporting frame 18 is swingably mounted on each of the underframes 16 and may be moved between a retracted position shown in FIG. 3 and an elevated position shown in FIG. 2 by means of pressure fluid cylinders 19. The oppositely directed free end portions of the supporting frames 18 of the carriage 12 define supporting surfaces 20 for supporting the exposed free end portions of a pipe or tube section 10. The supporting frames 18 are in their retracted position shown in FIG. 3, and the piston of the double-acting cylinder 17 is retained in a fixed position in relation to the cylinder when the pipe section 10 is loaded on the carriage 12 and the carriage is moved towards the concrete casting apparatus 13 to a position adjacent to the apparatus 13. In that position the cylinder chambers of the double-acting cylinder 17 may be interconnected so that the piston may be moved freely in relation to the cylinder, and the supporting frames 18 may be moved to their elevated position shown in FIG. 2 by means of the cylinders 19. Because the underframes 16 may move freely in relation to each other, relative movement between the supporting surfaces 20 and the free ends of the pipe section 10 may be avoided. In this manner, the pipe section 10 provided with the steel reinforcement 11 may be lifted to a level in which one end thereof may be engaged with a tilting device as described in more detail below. The carriage 12 may be moved along the track 14 by any suitable driving means, such as a hydraulic motor.

The concrete casting apparatus 13 comprises a tower-like frame 21 including vertically extending columns 22 and an upper stationary platform 23 fixed to the columns 22. An upper tube positioning device 24 is mounted on the platform 23. A lower platform 25 is vertically movable in the tower-like frame 21, for example by means of a rack-pinion driving arrangement, not shown. An annular mould device 26 is mounted on the platform 25 and is vertically moveable together therewith along a pipe or tube section 10, which is arranged in a vertical position within the tower-like frame 21 and retained in position by means of the upper tube positioning device 24 and by means of a tilting device 27 mounted at the lower end of the tower-like frame 21. Concrete may be supplied from a concrete supply 28, such as a silo, to the mould device 26 by means of a conveyor, such as a conveyor belt 29. When a tube or pipe section 10 has been provided with a layer 30 of reinforced concrete in the apparatus 13, the pipe section may be tilted back to a horizontal position and loaded on a carriage 31 (shown in more detail in FIGS. 17 and 18) and moved to a storage site. The carriage 31 is movable above the channel or ditch 15 along tracks 32 arranged at ground level on either side of the ditch or channel 15.

Figure 5:
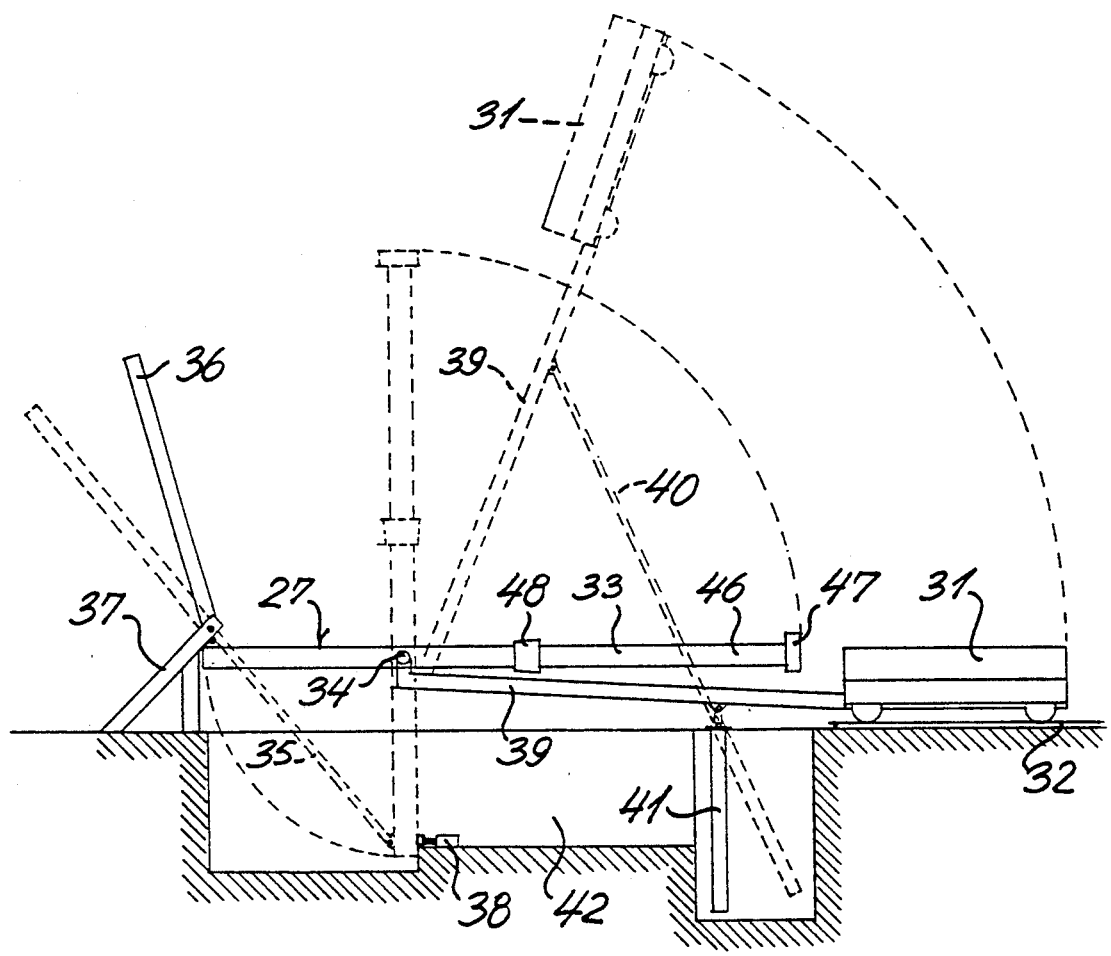
FIG. 5 is a side view showing a tilting device for tilting tube sections from a horizontal to a vertical position within the casting apparatus, and vice versa.
Figure 6:
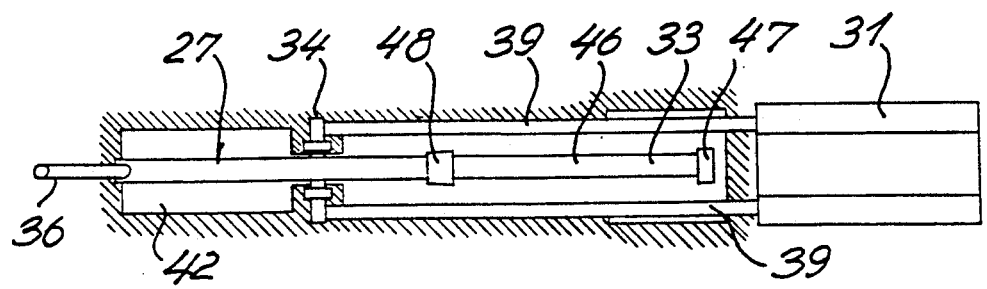
FIG. 6 is a top plan view of the tilting device shown in FIG. 5.

FIGS. 5 and 6 illustrate an embodiment of the tilting device 27. The tilting device comprises a bottom mandrel device 33 which is rotatably mounted about a pivot 34. One end of the mandrel device, which is arranged opposite to the tracks 32, is pivotally connected to a piston rod 35 of a pressure fluid cylinder 36, which is in turn pivotally connected to a post 37, so that the mandrel device 33 may be rotated between a substantially horizontal position shown in solid lines in FIG. 5 and a substantially vertical position, shown in broken lines in FIG. 5, in which the lower end of the mandrel device 33 may be stabilized and/or locked by means of guiding and/or locking means 38. A pair of lever arms 39 are also mounted rotatably about the pivot 34, and a piston rod 40 of a pivotally mounted pressure fluid cylinder 41 is pivotally connected to the lever arms 39. The free ends of the lever arms 39 may be received in channel members 39a extending longitudinally along the bottom of the carriage frame (FIG. 17), whereby the lever arms may be connected to the carriage 31. Consequently, the cylinder 41 may tilt the lever arms 39 and the carriage 31 connected thereto from a position in which the carriage 31 is supported by the tracks 32 as shown in solid lines in FIG. 5 to an upright position, shown in broken lines in FIG. 5, in which the finished, coated pipe section may be supported by the carriage 31. The guiding and/or locking means 38 as well as the fluid cylinder 41 may be arranged within a pit 42 as shown.

Figure 7:
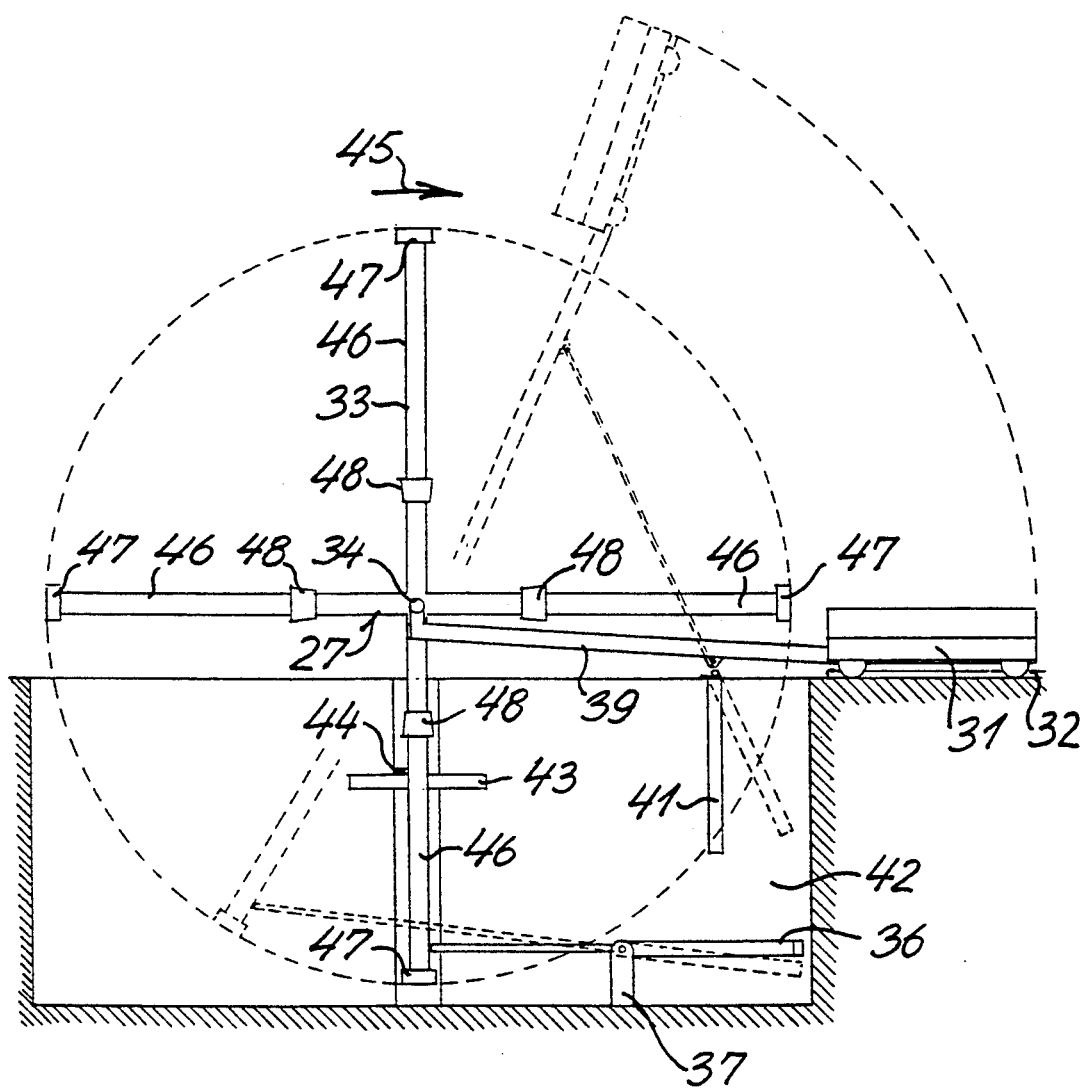
FIG. 7 is a side view showing an alternative embodiment of the tilting device shown in FIGS. 5 and 6.
Figure 8:
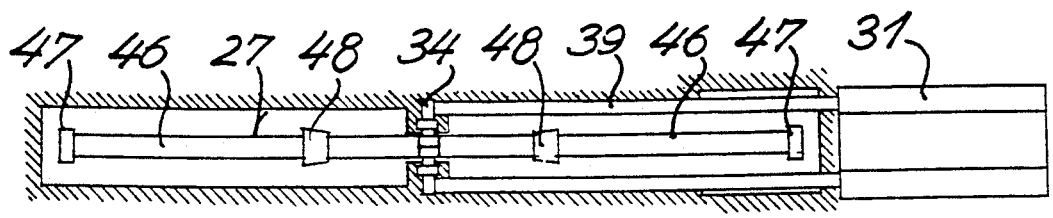
FIG. 8 is a top plan view of the tilting device shown in FIG. 7.

FIGS. 7 and 8 show and alternative embodiment of the tilting device shown in FIGS. 5 and 6, and corresponding parts are provided with the same reference numerals. While in FIG. 5 the mandrel device 33 is lever-like and tiltable through 90° between substantially horizontal and vertical positions, the mandrel device 33 of the tilting device 27 shown in FIG. 7 is formed like a cross having four arms and being rotatable about the pivot 34. The lower arm of the cruciformed mandrel member 33 may be guided between a pair of transversely spaced, parallel guiding members 43 and may be releasably locked in its substantially vertical position by means of one or more transverse locking members or abutment members 44, which may be operated for example by means of a pressure fluid cylinder, not shown. In FIG. 7 the cylinder 36 for rotating the cruciformed mandrel device 33 in a direction indicated by an arrow 45 may be a double-acting cylinder mounted at the bottom of the pit 42. The cylinder 36 may be adapted to move the mandrel device only through an acute angle, for example about 20°, to a position indicated in broken lines in FIG. 7.

The mandrel device 33 shown in FIG. 5 comprises a mandrel member 46 having a centering device 47 at its free end and a socket member 48, which surrounds the mandrel member 46, and which is axially spaced from the free end thereof. Each arm of the cruciformed mandrel device 33 of the tilting device 27 shown in FIG. 7 comprises a mandrel member 46 having a centering device 47 at its free end and a socket member 48 spaced longitudinally therefrom.

Figure 9:
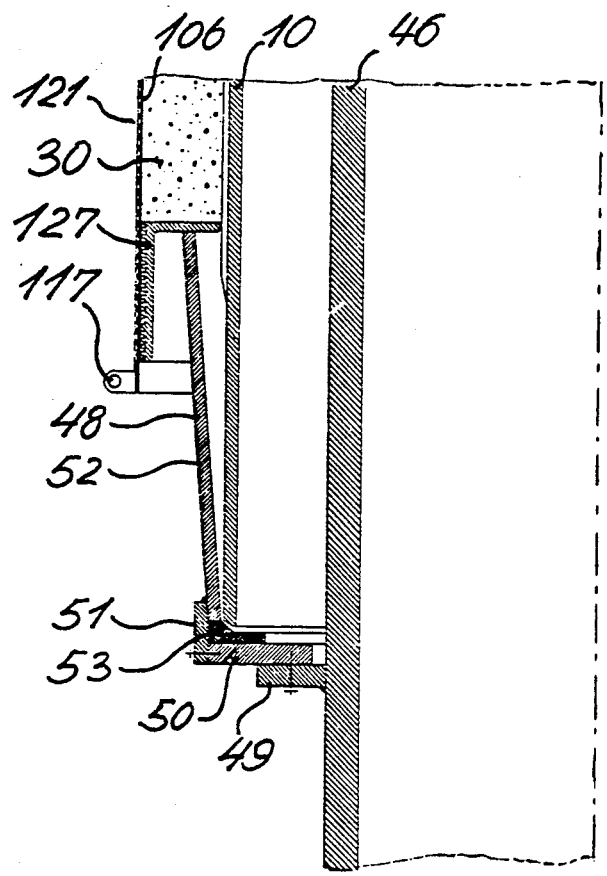
FIG. 9 is a sectional view shown in an enlarged scale of a socket formed on the tilting device for receiving one end portion of a tube section to be coated.

Each mandrel member 46 is adapted to be inserted into an adjacent end of a pipe or tube section 10, which is moved to the tilting device in a horizontal position, for example by means of a carriage 12, and the exposed end portion of the pipe section 10 may then be received in the socket member 48, which is shown in more detail in FIG. 9. The socket comprises an annular, radial flange 49, which may be welded to the outer peripheral surface of the mandrel member 46, an annular member 50, fastened to the flange 49, and a peripheral member 51 fastened to the member 50. One end of a slightly frusto-conical socket wall 52 is fastened to the peripheral member 51, and an annular member 53 of a soft metal, such as aluminum, is located between the inner end of the socket wall 52 at the adjacent side surface of the annular member 50. The annular member 53 may abut with the inner end surface of a tube section 10 being inserted into the socket member 48 without damaging such end surface.

Figure 10:
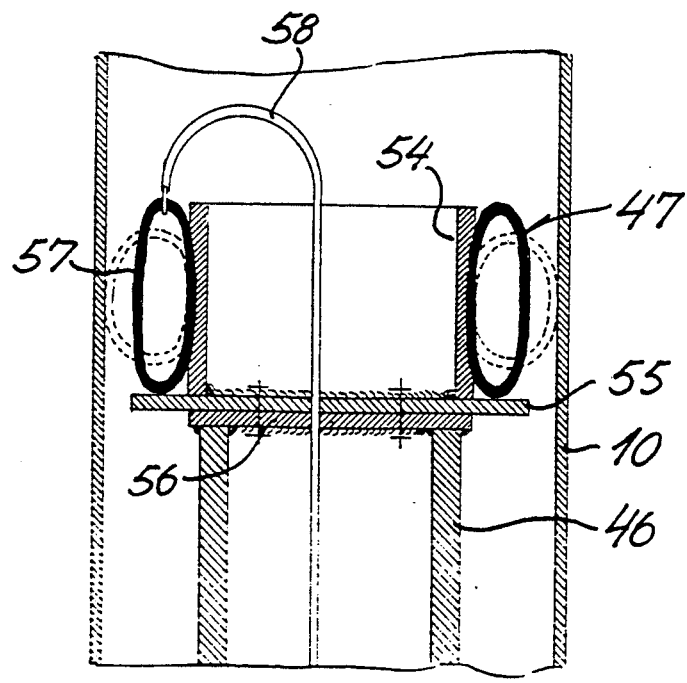
FIG. 10 is a side view and sectional view shown in enlarged scale of a centering device formed on the tilting device for engagement with the inner surface of a tube section to be coated.

As shown in FIG. 10, the centering device 47 arranged at the free end of the mandrel member 46 comprises a cylindrical wall 54, which extends outwardly from, and which has its inner end fastened to a substantially circular base plate 55 having a diameter substantially exceeding the diameter of the cylindrical wall 54 so that the rim portion of the base plate 55 extends radially outwardly from the wall 54. The base plate 55 is releasably fastened to an end wall 56 at the outer end of the mandrel member 46, for example by means of bolts or other releasable fastening means, so that the centering device 47 may be replaced and adapted to the inner diameter of the pipe section to be coated with concrete. The centering member 57, which may, for example, be pressure moulded from rubber or plastic material, may have a substantially elliptical cross-section in its deflated or contracted condition, and when the centering member is inflated or expanded its cross-sectional shape tends to become circular and fills out the annular space defined between the inner peripheral surface of the tube section 10 mounted thereon, and the outer peripheral surface of the cylindrical wall 54. The centering member 57 may be expanded by any desired pressure fluid, such as liquid. In the preferred embodiment, however, the centering member 57 is inflated by air or another gas. The pressure fluid may be supplied to the centering member 57 through a supply conduit 58 which may be connected to a suitable fluid pressure source, not shown. The centering member may also be deflated through the conduit 58.

Figure 11:
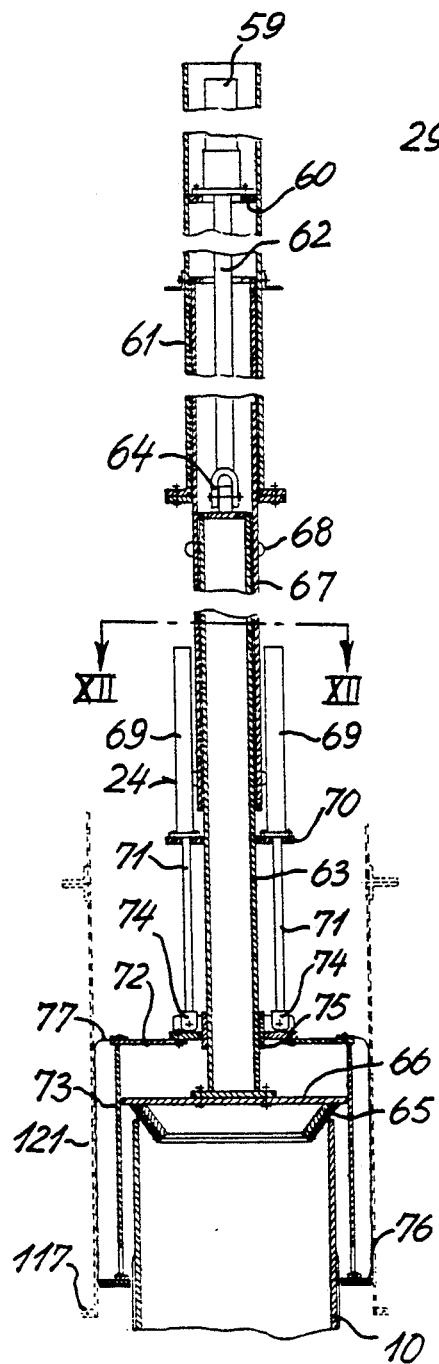
FIG. 11 is a sectional view of a top centering arrangement.
Figure 12:
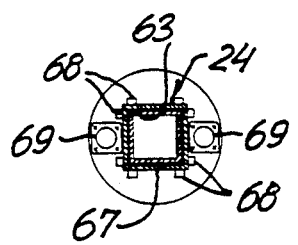
FIG. 12 is a cross-sectional view along the line XII—XII in FIG. 11.

When a pipe or tube section 10 provided with a steel reinforcement 11 has been tilted from a horizontal to a vertical position within the tower-like frame 21 by means of the tilting device 27 as will be further described below, the upper end of the vertical extending pipe section 10 may be retained in position by means of the upper tube positioning device 24, which is mounted on the upper stationary platform 23, and which will now be described in more detail with reference to FIGS. 11 and 12. The positioning device 24 comprises a pressure fluid cylinder 59, which is mounted on an inner flange 60 formed within an outer tubular casing 61 mounted on the stationary platform 23. The cylinder 59 comprises a piston rod 62 extending downwardly through the casing 61. The outer end of the piston rod 62 is connected to the upper end of an inner telescopic tube 63, which may have a square cross-sectional shape as shown in FIG. 12. A conical peripheral surface of a conical tube positioning member 65 having an end wall 66, which is connected to the free end of the telescopic tube 63, may engage with the upper end opening of the vertical tube section 10, and the peripheral conical surface may be coated with an outer layer of aluminum, plastic, or another relatively soft material which cannot damage the upper free edge of the tube section 10. The telescopic inner tube 63 extends through an outer guide member 67 forming an extension of the tubular casing 61. Axial telescopic movement of the inner tube 63 in relation to the outer guide member 67 may be guided by a number of steel rollers 68 which are rotatably mounted in the outer guide member 67.

A pair of pressure fluid cylinders 69 are mounted on a flange 70, which is fastened to and extends radially outwardly from the outer surface of the telescopic tube 63. Each of the cylinders 69 comprises a piston rod 71 having its free end connected to an end wall 72 of a cylinder 73 via a link connection 74. The end wall 72 comprises a central slide ring 75 having a cross-sectional shape complementary to the cross-sectional shape of the telescopic tube 63 and being in sliding engagement with the outer surface thereof. A pressure ring or finishing ring 76 is fastened to the lower end of the cylinder 73 and may, for example, be made from plastic or rubber material or a similar flexible material. The outer peripheral edge surface of the end wall 66 of the positioning member 65 may be in sliding engagement with the inner peripheral surface of the cylinder 73. A skirt 77 of a plastic or rubber film may extend between the end wall 72 and the pressure ring 76 in radially spaced relationship to the outer peripheral surface of the cylinder 73.

Figure 13:
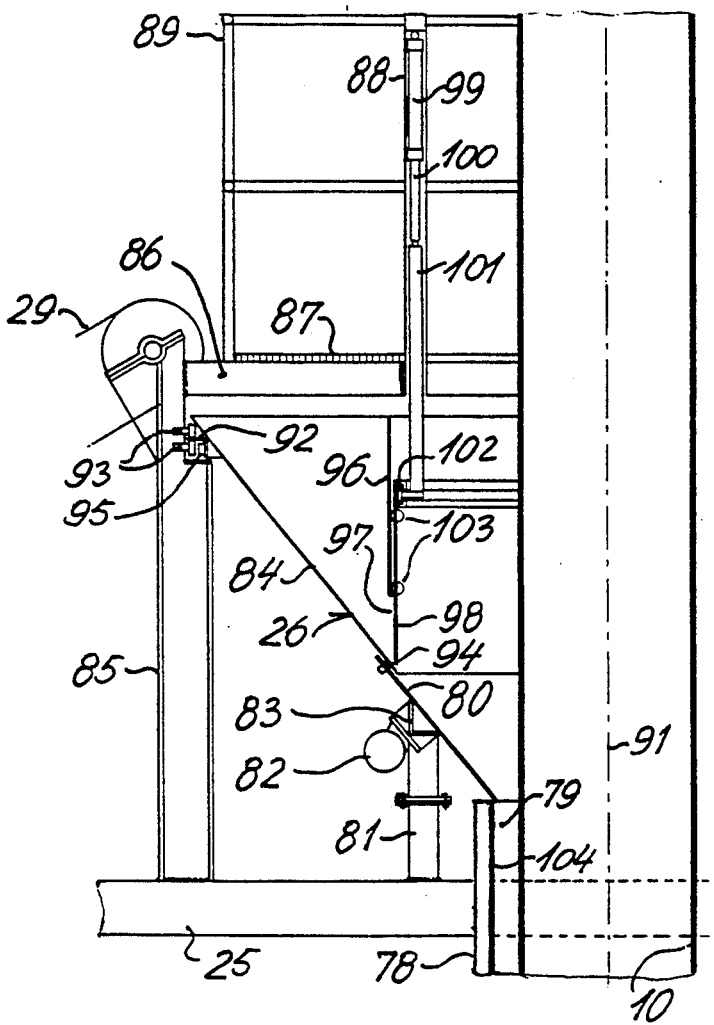
FIG. 13 is a side view and partially sectional view of a concrete supply funnel arrangement of the concrete casting apparatus.

The mould device 26 mounted on the movable platform 25 will now be further described with reference to FIGS. 13–16. A cylindrical, tubular mould part 78 having an inner diameter substantially exceeding the outer diameter of the pipe section 10 is mounted in a central opening of the platform 25 so that the longitudinal axis of the tubular mould 78 extends substantially vertically. A pipe section 10, which has been arranged in the tower-like frame 21 by means of the tilting device 27, may extend coaxially through the tubular mould 78 so as to define an annular mould cavity 79 between the outer peripheral surface of the pipe section 10 and the inner peripheral surface of the mould 78. A lower funnel-part 80 is stationarily supported by and fastened to the movable platform 25 by means of posts 81 (only one shown in FIG. 13), and a number, for example four, of vibrators 82, which may, for example, be driven by electric motors are arranged on a reinforcing member 83, which extends peripherally along the outer surface of the funnel part 80, and which may have an angular cross-section as shown in FIG. 13. The funnel part 80 opens into the upper end of the annular mould cavity 79. An upper funnel part 84, which may have a frusto-conical shape as shown, is partly supported by a number of posts (only one shown in FIG. 13) extending upwardly from the platform 25. The posts 85 also supports a horizontal beam structure 86 arranged above the upper funnel part 84 and defining an annular foot bridge 87 with inner and outer guard rails 88 and 89, respectively.

The upper funnel part 84 is mounted rotatably about its longitudinal axis 91 coinciding with the central axes of the lower funnel part 80, the tubular mould 78, and the pipe section 10. Thus, an outer, peripherally extending flange 92 formed at the upper end of the rotatable funnel part may pass through nips defined between pairs of rollers 93 mounted on the posts 85. The lower rim portion of the rotatable, frusto-conical funnel part 84 may overlap the upper rim portion of the stationary lower funnel part 80, and small rollers 94 rotatably mounted therebetween may serve to reduce the friction between the overlapping rim portions. The rotatable funnel part 84 may be rotated by any suitable driving means. In the preferred embodiment, a toothed rim 95, which is mounted on the outer surface of the upper part of the rotatable funnel part 84 may drivingly cooperate with a pinion driven by a stationarily mounted motor, such as a hydraulic motor, pneumatic motor or electric motor, not shown.

A cylindrical wall 96 is mounted coaxially within the upper part of the rotatable funnel part 84, so that an annular passage 97 is defined between the inner surface of the funnel part 84 and the lower free edge of the cylindrical wall 96. A cylindrical sliding valve member 98 is arranged coaxially within the cylindrical wall 96 so that the outer surface of the sliding valve member is in sliding engagement with the inner surface of the cylindrical wall 96. Pressure fluid cylinders 99 arranged within hollow vertical posts forming part of the inner guard rail 88 is connected to the upper end of the sliding valve member 98, so that the cylinders 99 may move the sliding valve member 98 between a lower position in which the annular passage 97 is closed as shown in FIG. 13, and an upper position, in which the passage 97 is open. Each of the cylinders 99 has a piston rod 100 having a connecting rod 101 fastened to its free outer end. A roller 102, which is rotatably mounted about a horizontal axis at the lower free end of the connecting rod 101, may cooperate with a downwardly opening circular channel formed at the upper end of the sliding valve member 98. Thus, the funnel part 84 may rotate together with the cylindrical wall 96 and the sliding valve member 98 while the cylinders 99 are kept stationary. Guiding rollers 103 may engage with the inner cylindrical surface of the sliding valve member 98 to support the same during its rotational and axial movement.

The cylindrical tubular mould 78 may be of the type disclosed in Danish patent application No. 644/84, which means that the mould may comprise an upper steel cylinder 104 having diametrically oppositely arranged vibrators. The upper end of a perforated cylindrical skirt 106 having substantially the same inner diameter as the tubular mould 78 may be fastened to the lower end of the same, for example by means of a flanged joint 107. As best shown in FIG. 15, the perforated skirt 106 may have through-going small openings or bores 108 arranged in a square-mesh network, and raised areas 109 may be located between the openings or bores 108. The raised areas may have any shape or outline. In the preferred embodiment, however, each of the areas has a square shape, and the raised areas define a square-mesh network. The skirt 106, which is preferably made from steel plate, should be radially expandable and contractible to a certain extent. Therefore, the skirt 106 is preferably provided with a number of peripherally spaced, axially extending slits 110. As shown in FIG. 15 each of the slits may extend from a position spaced from the upper edge of the skirt 106 and open into the lower edge of the skirt, and the open end of each slit at the lower edge of the skirt is then preferably closed by means of rubber, plastic, or another elastic material 111 adhering to the lower edge of the skirt 106 allowing a slight radial expansion of the skirt.

An annular foot bridge 112 is suspended from the movable platform 25 by means of inner and outer guard rails 113 and 114, respectively. An inflatable annular member 115 is positioned around and in abutting relationship with the lower part of the inner guard rail 113, and abutment plates are arranged along the outer periphery of the inflatable member 115, which is consequently arranged between the inner guard rail 113 and the abutment plates 116, which are radially spaced therefrom. Each section of the perforated skirt 106 defined between a pair of peripherally adjacent slits 110 is provided with a lug 117 arranged at the lower edge of the skirt 106. A substantially radially extending screw connector 118 having an adjustable length interconnects each of the lugs 117 and an associated abutment plate 116. Pressure fluid may be supplied to the inflatable annular member 115 through a supply tube 119, which may be supplied to a suitable pressure fluid source, not shown, such as an air compressor or a hydraulic pump. It is understood that inflation or expansion of the annular member 115 causes a radial expansion of the lower end of the skirt 106. When, however, the annular member 115 is deflated, the skirt is moved back to its original contracted position, for example by means of a ring 120, which may be positioned around the lower end of the skirt 106, and which is made from an elastic material, such as rubber.

An outer cylindrical skirt 121 of a flexible material, such as a sheet material of plastic or rubber, is snugly fitted around the outer surface of the perforated skirt 106 so that the flexible skirt 121 may be in abutting engagement with the raised areas 109 on the outer surface of the perforated skirt. Thus, a closed chamber 122 is defined between the outer peripheral surface of the perforated skirt 106 and the inner peripheral surface of the flexible skirt 121, and this chamber is connected to a vacuum pump 123 mounted on the platform 25 or to another vacuum source through a connecting conduit 124.

Figure 17:
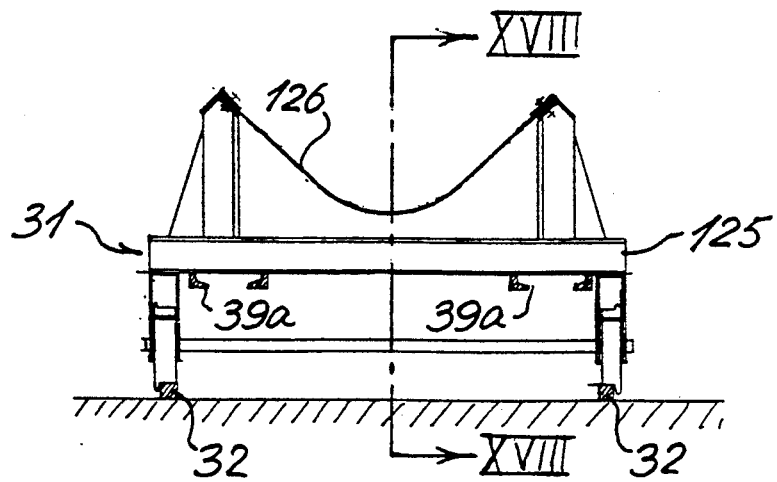
FIG. 17 is an end view of a carriage for transporting tube or pipe sections coated with a layer of concrete from the casting apparatus.
Figure 18:
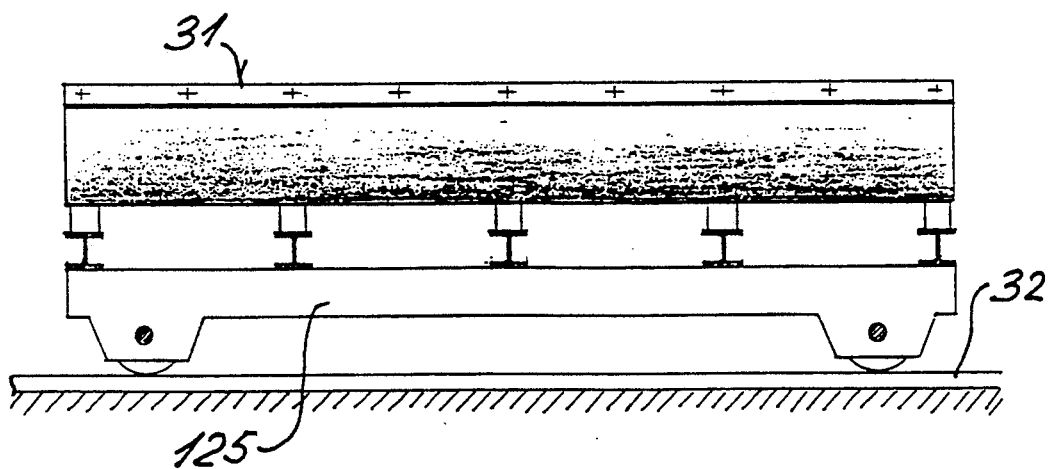
FIG. 18 is a sectional view along the line XVIII—XVIII in FIG. 17.

FIGS. 17 and 18 illustrate the carriage 31 for transporting tube sections 10 provided with an outer layer of reinforced concrete 30 from the tower-like frame 21 to a storage location. The carriage 31 comprises a wheeled frame 125 having a bed 126 for supporting the outer surface of the concrete layer formed on the pipe section 10. The bed 126 may be made from a flexible sheet material, such as a sheet of reinforced rubber or plastic, and such sheet may be fastened to the carriage frame 125 along its longitudinal edges. The vertical position of the bed 126 is preferably adjusted so that the longitudinal axis of a coated pipe section supported by the bed 126 in a horizontal position substantially coincides with the longitudinal axis of the mandrel member 46, when such mandrel member is in its horizontal position.

The operation of the apparatus described above will now be discussed in more detail.

A pipe or tube section 10 provided with a steel reinforcement 11 is placed on a carriage 12, which is moved to the tilting device 27 along the track 14, which is positioned below ground level. When the carriage 12 has reached a position adjacent to the tilting device 27, the supporting frames 18 are moved to their elevated position so as to place the pipe section 10 in alignment with the horizontally arranged mandrel member 46 of the tilting device 27. An annular member 127, which may have an angular cross-section as shown in FIG. 9, is now positioned around the end portion of the pipe section 10 for restricting the axial extension of the concrete coating to be cast around the pipe section. The carriage 12 is now moved further to the left (as viewed in FIG. 1), whereby the mandrel member 46 with the centering device 47 is inserted in the pipe section 10, and the free end portion of the pipe section is received in the socket member 48 as shown in FIG. 9. Pressure fluid is now supplied through the conduit 58 to inflate or expand the centering member 57 so as to centre the mandrel member 46 within the tube or pipe section 10.

The mandrel member 46 and the tube section 10 mounted thereon is now tilted to the vertical position indicated by broken lines in FIG. 5 by means of the pressure fluid cylinder 36 and the tilting movement is limited by the guiding means 38, which may also be adapted to lock the tilting device in this position. The carriage 12 may now be returned to have a new pipe section 10 loaded thereon.

When a tilting device 27 of the type shown in FIG. 7 is used, a non-coated pipe or tube section 10 is moved to the tilting device in a horizontal position from the left-hand side as viewed in FIG. 7. The tube section may be supported by a carriage so that the axis of the tube section and the axis of the horizontal mandrel member 46 are substantially aligned. When the pipe section has been received around the mandrel member 46 the tilting device 47 is rotated 90° in the direction indicated by the arrow 45, and the downwardly extending arm may be locked in position by means of the locking member 44.

When the pipe section 10 to be coated is tilted to its vertical position as just described, the movable platform 25 of the tower-like frame 21 is in its upper position, and the upper positioning device 24 is now operated and caused to position the upper free end of the tube section 10. Thus, pressure fluid is supplied to the cylinder 59 to cause the positioning member 65 to engage with the upper end opening of the tube section 10, whereafter the centering member 57 may be deflated. Pressure fluid is now supplied to the annular member 115 through the supply tube 119 so as to expand the lower end of the perforated cylindrical skirt 106 to allow the skirt to pass the annular member 127, when the movable platform is subsequently moved to its lower position, in which the annular member 127 is surrounded by the cylindrical tubular mould 78, whereby a mould cavity is defined between the inner peripheral surface of the mould 78, the outer peripheral surface of the pipe section 10 and the upper surface of the annular member 127.

By means of a feeding belt 128 arranged at the bottom of the silo 28, a uniform flow of concrete is now supplied to the conveyor 29, which feeds the concrete into the upper rotating funnel part 84. The rotation of the funnel part 84 causes a substantially uniform peripheral distribution of the concrete within the funnel part, and the annular passage 97 is now partly opened by actuating the cylinders 99, and the vibrators 82 are operating, whereby concrete is caused to flow continuously into the non-rotating lower funnel part 80 and down into the mould cavity 79. As concrete flows into the mould cavity the electromagnetic vibrators mounted on the mould 78 are also operated, whereby the concrete behaves almost like a liquid and is compacted. The casting operation may be watched by an operator standing on the foot bridge 87, and when the mould cavity is about to be filled with concrete, the movable platform and the mould device 26 mounted thereon are moved slowly upwardly, the upwards movement and the supply of concrete being controlled so that the upper surface of the vibrated concrete in the mould cavity is located slightly below the upper edge of the mould 78.

When the mould 78 has been moved upwardly to such a level that the lower end of the perforated skirt 106 is in engagement with the peripheral surface of the annular member 127 which may be covered by an outer layer of rubber, plastic or a similar flexible material, the annular member 115 is deflated so that the lower end portion of the skirt 106 is pressed into tight engagement with the peripheral surface of the annular member 127 by means of the elastic ring 120. Now, the vacuum pump 123 is started so as to provide a vacuum within the vacuum chamber 122 and because of the perforations 108 the outer surface of the cast concrete layer surrounded by the skirt 106 will also be exposed to vacuum. The atmospheric pressure to which the outer surface of the flexible cylindrical skirt 121 is exposed, causes a radial compression of the slitted perforated skirt 106 and consequently of the layer of concrete formed around the pipe section 10. The radial pressure and the vacuum to which the outer surface of the concrete layer is exposed, causes an improved compaction of the concrete and causes surplus water to be sucked through the perforations 108 into the vacuum chamber 122 and to the vacuum pump 123 through a conduit or conduits 124, and such removed surplus water may be collected in a suitable reservoir.

The casting process is continued till the desired axial length of the pipe section 10 has been covered by a concrete layer. In order to increase the rate of casting a minimum amount of water is preferably added to the concrete mixture and surplus water may be removed by vacuum as just described.

The upper end of the conveyor 29 may be hinge-connected to the movable platform 25, and the lower end of the platform may be provided with a transverse shaft 129, which is displaceably mounted in the frame of the silo 28 so that the lower end of the conveyor 29 may be displaced when the platform 25 moves vertically in relation to the tower-like frame 21. When a desired axial length of a concrete coating has been cast, the supply of concrete is stopped, and the annular passage 97 is closed by the sliding valve member 98, while the upward movement of the platform 25 is continued. In order to obtain a compact an well-defined upper end-surface of the concrete layer 30, the cylinders 69 are caused to press the finishing ring 76 downwardly into contact with the concrete. The finishing ring 76 is maintained in this position while the platform 25 is moved upwardly. During the last part of the upward movement of the platform 25 the perforated cylindrical skirt 106 is gradually moved upwardly beyond the finishing ring 76. The inner peripheral surface of the perforated skirt 106 will then come into sealing contact with the outer peripheral surface of the sealing skirt 77, whereby vacuum may be maintained within the vacuum chamber 122, so that also the upper part of the concrete layer may be exposed to vacuum treatment. When the casting process is terminated, the cylinders 69 are caused to move the finishing ring 76 back to its retracted position, and the cylinder 59 is caused to retract the conical positioning member 65 from the upper end of the pipe section 10. The annular centering member 57 is now inflated or expanded to engage with the inner surface of the pipe section 10. The cylinder 41 is actuated so as to move the lever arm 39 and the carriage 31 mounted thereon to the elevated position shown in broken lines in FIG. 5. The mandrel member 46 and the coated tube section 10, 30 mounted thereon is now moved towards a horizontal position, and the movement is controlled by the pressure fluid cylinder 36. When the coated tube engages with the bed 126 of the carriage 31, the carriage with the tube loaded thereon is moved to a horizontal position controlled by the cylinder 41. When the carriage and the coated tube is in the horizontal position, the centering member 57 is deflated, and the carriage 31 is disconnected from the lever arm 39. The coated tube may now be moved to a desired location for curing or hardening of the concrete. The bottom mandrel device 33 is now ready for receiving another pipe section to be coated.

EXAMPLE

The tube sections 10 being coated may have a length of 12 m and a diameter of 200–1000 mm. The reinforcement 11 may comprise a helically wound steel wire with a diameter of 8 mm, and the axial pitch of the helical winding may be 100 mm. The reinforcement may further comprise longitudinally extending steel wires having a diameter of 6 mm and being welded to the windings of the helical wire. The radial thickness of the concrete layer may be 50–120 mm. Each of the uncoated end portions (the so-called "cut-backs") may be about 300 mm.

The perforated cylindrical skirt 106 may be made from steel plate with a thickness of about 2.5 mm, and the diameter of the openings or bores 108 may be approximately 1 mm. The mutual spacings of the openings or bores 108, which are arranged in a square-mesh network, may be about 10 mm. Each of the raised areas 109 may be a square with a side length of about 5 mm and the depths of the channels defined therebetween may be about 1 mm. The outer flexible skirt 121 may be made from a non-reinforced plastic sheet, and the vacuum provided within the vacuum chamber 122 may be about 90%. The outer peripheral surface of the concrete layer will then be exposed to a radially inwardly directed pressure of about 8.000 kg/m$^2$. It will then be possible to cast the concrete layer at a production rate of about 2 m/min., which means that the movable platform 25 may move upwardly at that rate.

It should be understood that numerous changes and modifications of the embodiment shown in the drawings and described above could be made within the scope of the present invention. As an example, the method and apparatus according to the invention could be used for casting a layer of concrete around a rod-shaped member, and the outer surface of the concrete layer need not have a circular cross-section but may have any further cross-sectional shape, such as a polygonal shape. The various pressure fluid cylinders mentioned may be hydraulic or pneumatic cylinders actuated by pressure fluid and compressed air, respectively.

I claim:

1. A method of coating an outer surface of a pipe section for submarine pipelines or a tube section of a long length with a layer of concrete, the method comprising the steps of:

moving the pipe section with a longitudinal axis of the pipe section extending substantially horizontally to a power operated rotatable lifting member, connecting a first end of the pipe section to the lifting member, rotating the lifting member about a horizontal axis extending substantially at right angles to the longitudinal axis of the pipe section so as to tilt the pipe section to an upright position, whereby a second opposite end of the pipe section is raised to define an upper end of the upright pipe section, arranging an annular mould around the outer surface of the upright pipe section so as define an annular space between the annular mould and the outer surface of the upright pipe section, feeding a concrete mixture into an upper part of the annular space, moving the annular mould upwardly along the pipe section so as to coat the pipe section by forming the layer of concrete on the outer surface of the upright pipe section, and rotating the lifting member about the horizontal axis so as to tilt the coated pipe section back to a horizontal position.

2. A method according to claim 1, further comprising exposing the concrete layer formed on the outer surface of the pipe section to vacuum through perforations formed in a lower skirt of the annular mould so as to withdraw free water from the concrete layer and thereby stabilize the concrete layer.

3. A method according to claim 2, wherein the perforations of the skirt are communicating with a vacuum chamber defined between an outer surface of the skirt and an outer peripheral wall surrounding the skirt.

4. A method according to claim 3, wherein the skirt is axially slitted and the outer peripheral wall is made from a flexible material, whereby the layer of concrete is exposed to radial compression when the vacuum chamber is connected to a vacuum source.

5. A method according to claim 1, wherein the annular mould is moved substantially vertically along a tower structure, the pipe section being tilted to an upright position within the tower structure by means of the rotatable lifting member which is arranged at a lower part of the tower structure.

6. A method according to claim 5, wherein the concrete mixture is fed to an upper funnel part of the annular mould, the funnel part of the annular mould being rotated in relation to a remaining part of the annular mould so as to distribute the concrete mixture peripherally in the annular space defined in the annular 7. An apparatus for coating an outer surface of a pipe section for submarine pipelines or a tube section of a long length wit a layer of concrete so as to form a coated pipe section, the apparatus comprising:

a frame structure, a lifting member arranged in a lower part of the frame structure tiltably about a substantially horizontal axis, means for connecting a first end of the pipe section arranged in a horizontal position to the lifting member, power means for rotating the lifting member about the horizontal axis extending at substantially right angles to a longitudinal axis of the pipe section so as to tilt the pipe section to an upright position within the frame structure, whereby a second opposite end of the pipe section is raised to define an upper end of the upright pipe section, means for retaining the pipe section in the upright position within the frame structure, an annular mould for surrounding the upright pipe section so as to define an annular space between the pipe section and the annular mould, means for feeding a concrete mixture into an upper part of the annular space, and means for moving the annular mould upwardly along the pipe section so as to form the layer of concrete on the outer surface of the pipe section.

8. An apparatus according to claim 7, further comprising a perforated skirt depending from the annular mould and forming a lower extension of the annular mould, and means for exposing the concrete layer to vacuum through perforations defined in the skirt, so as to withdraw free water from the concrete layer and thereby stabilize the concrete layer.

9. An apparatus according to claim 8, wherein the vacuum exposing means comprise an outer peripheral wall surrounding the skirt so as to define a vacuum chamber between the skirt and the outer peripheral wall of the vacuum exposing means.

10. An apparatus according to claim 9, wherein the skirt is axially slitted and the outer peripheral wall is made from a flexible material, whereby the layer of concrete is exposed to radial compression when the vacuum chamber is connected to a vacuum source.

11. An apparatus according to claim 10, wherein the connecting means comprise a mandrel member to be received in an axial bore of the pipe section, and expansible means arranged on the mandrel member to engage with an inner peripheral surface of the bore in an expanded condition of the expansible means.

12. An apparatus according to claim 11, wherein the expansible means comprise a hollow annular inflatable member positioned around the mandrel member.

13. An apparatus according to claim 12, wherein the connecting means comprise a socket member for receiving an end portion of the pipe section therein.

14. An apparatus according to claim 7, wherein the lifting member comprises four mandrel members extending outwardly from the substantially horizontal axis in a cruciformed arrangement.

15. An apparatus according to claim 7, wherein the power means are operatable so as to tilt the coated pipe section back to a horizontal position.

16. An apparatus according to claim 15, wherein the frame structure is a tower structure comprising vertically extending guiding means for guiding movement of the annular mould.

* * * * *

UNITED STATES PATENT AND TRADEMARK OFFICE
CERTIFICATE OF CORRECTION

PATENT NO. : 5,322,656

DATED : June 21, 1994

INVENTOR(S) : Pallesen

It is certified that error appears in the above-identified patent and that said Letters Patent is hereby corrected as shown below:

On the title page:
In the abstract, line 8, delete "comprises" and insert --includes--.

In claim 6, column 14, line 48, insert --mould.-- after the word "annular".

In claim 7, column 14, line 51, delete "wit" and insert --with--.

Signed and Sealed this

Fifteenth Day of November, 1994

Attest:

BRUCE LEHMAN

*Attesting Officer*       *Commissioner of Patents and Trademarks*